Jan. 31, 1950

E. LABIN ET AL

SELECTABLE BAND WIDTH ELECTRICAL PULSE MULTICHANNEL COMMUNICATION SYSTEM

Filed April 2, 1945

2,495,739

INVENTORS
EMILE LABIN
DONALD D. GRIEG

BY Percy P. Lantzy

ATTORNEY

Patented Jan. 31, 1950

2,495,739

UNITED STATES PATENT OFFICE 2,495,739

SELECTABLE BAND WIDTH ELECTRICAL PULSE MULTICHANNEL COMMUNICATION SYSTEM

Emile Labin, New York, and Donald D. Grieg, Forest Hills, N. Y., assignors to Federal Telephone and Radio Corporation, New York, N. Y., a corporation of Delaware Application April 2, 1945, Serial No. 586,228

2 Claims. (Cl. 179—15)

This invention relates to multiple channel signalling systems and more particularly to improved multiplex systems of the pulse-modulating type.

Various systems of transmitting intelligence in the form of pulse carriers have been proposed, of which the system disclosed in U. S. Patent 2,262,838 is typical. As is known, such systems convey the intelligence in the form of sharp pulses of energy, wherein the time spacing between successive pulses, or the amplitude of successive pulses, bears a definite relation to the corresponding signal voltage to be transmitted. Such methods of transmission are generally known as "pulse modulation" methods, wherein the intelligence-representing impulses occur at a frequency at least as high as, and normally much higher than, the highest significant frequency component in the wave form of the intelligence being conveyed. It has been proposed to multiplex the intelligence signals by controlling successive pulses of each recurring series, by separate signal sources. This of course requires the recurrent switching in of each source, at a high frequency rate so that at any given pulse instant the signal from only one source is being transmitted. In view of the high rate of succession of the successive pulses, electronic switching or timing means is required. In such systems therefore, the switching elements or separators must have a definite repetition rate.

Where the intelligence signals to be transmitted are of substantially uniform amplitude or simple wave shape over considerable time intervals, the wave shape can be represented by a relatively small number of pulses. On the other hand, where the intelligence signal is of relatively complex wave contour, a considerably greater number of pulses must be transmitted in a given time in order faithfully to represent and reproduce the signal. It has been known for some time that the limiting factor determining the upper significant audio frequency transmission limit in a pulse modulation system is the repetition rate of the system. It has been determined that this repetiion rate should be approximately two and one-half to four times the uppermost significant audio frequency, in order to delineate the impulse wave form with the requisite accuracy. The exact value of the base pulse repetition rate depends on the particular system used and the highest frequency that is desired to be transmitted. As an example in one system in use, the repetition rate is 12,000 C. P. S. for a significant audio frequency band width of 3,000 C. P. S. In another system, there is used a base repetition rate of 8,000 C. P. S. in addition to a common marker pulse at the same rate, in order to provide a modulating band width of approximately 3,200 C. P. S.

Fundamentally, in order to increase the audio frequency band width, it is necessary to increase the number of pulses which delineate the higher audio frequency components. Normally, in order to effect this increase in band width, the base repetition rate would be increased accordingly.

Therefore, it is a principal object of this invention to provide an arrangement whereby greater audio frequency band width in the intelligence signals can be transmitted over existing pulse modulation equipment without changing the normal base repetition rate of the system as a whole.

A feature of the invention relates to a multichannel pulse modulation system which is normally designed for a given repetition rate, together with means for adapting the system to transmit signal band widths of much greater range than those for which each channel is normally designed.

Another feature relates to a multi-channel pulse modulation system having a plurality of modulation channels each of fixed band width, in conjunction with a special switching and interconnecting arrangement for enabling a given intelligence message to be transmitted over two or more of the pulse channels in accordance with the detail of delineation required in the pulse modulation envelope corresponding to the given intelligence.

A further feature relates to a multi-channel pulse modulating system having means to increase its service flexibility in correspondence with the delineated detail required in the modulated and demodulated signal envelope.

A still further feature relates to the novel organization, and interconnection of parts which cooperate to provide an improved and highly flexible communication system of the pulse modulation type.

Other features and advantages not particularly set forth will be apparent from a consideration of the following detailed description and the appended claims.

Inasmuch as pulse modulation systems are generally known in the art, only those parts are illustrated schematically herein as are required to explain the inventive concept and the preferred form of carrying it into practice. Accordingly, in the drawing, Fig. 1 is a composite schematic and block diagram illustrating a signal system embodying principles of the invention.

Figure 1:
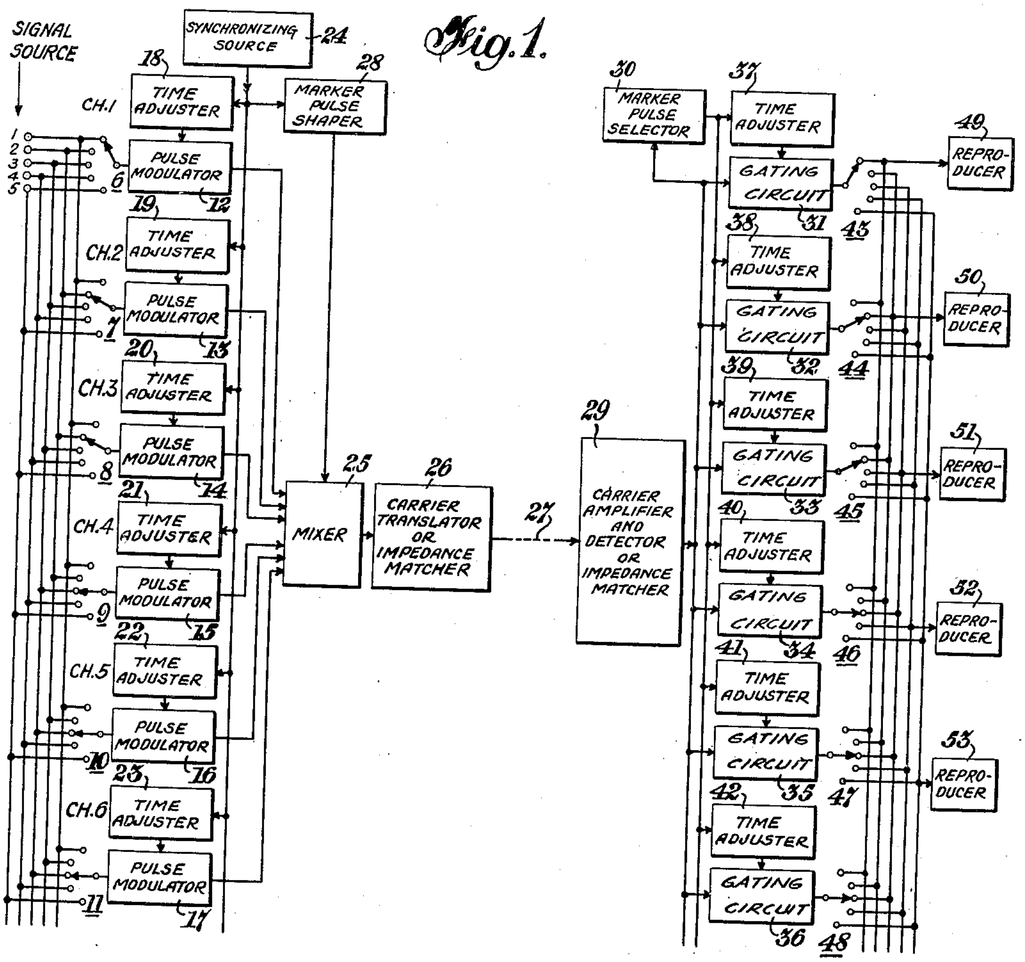

Referring to Fig. 1, there is shown part of a twenty-four channel pulse modulating system. This figure shows six of the twenty-four channels, but it will be understood that a greater or less number may be used. Merely for purpose of illustration, there are shown five separate signal sources 1—5, although a greater or less number may be employed. Each of the signal sources is multipled to the stationary contacts of a series of switches 6—11, there being one switch for each of the twenty-four separate pulse modulation channels. The movable contact arm of each switch is connected to the respective pulse modulation unit 12—17, these modulating units being rendered effective in succession and at cyclically recurrent timed intervals under control of an associated time adjuster or phasing unit 18—23. The repetition rate of the respective channels is controlled by a master synchronizing source 24, which is common to all the modulation channels. The pulses from all the modulation units are fed into a common mixer 25, whose output is applied to a carrier translator unit 26, in the event the link 27 is a radio channel, or to an impedance matching unit in the event that the link 27 is a physical or wire channel. Preferably, the synchronizing source 24, which may provide synchronizing energy either in the form of a wave or train of pulses, is also connected to the mixer 25 through a suitable synchronizing pulse shaper unit 28 to provide marker pulses M for transmission with the channel pulses.

At the receiving end of the system, the received pulse modulated carrier is amplified in device 29 and the pulses are detected therefrom by means of a suitable detector. If the transmission is over a wire line, the unit 29 will be a suitable impedance matching unit. The output of unit 29 is applied to a synchronizer or marker pulse selector 30 connected in common to the selector or gating channels which are equal in number of modulation channels at the transmitter. Each gating channel is provided with an individual gating circuit 31—36, and an associated time adjuster 37—42. The gating circuits may each comprise amplifiers to which the pulses from the time marker selector are applied through the time adjuster circuits so that the tubes will be conditioned to pass applied pulses at the proper timing intervals. The marker pulse energy separated at 30 is applied to the time adjusters 37—42 of known form to retard or shift in phase the marker pulse energy for unblocking the associated gating circuit in the correct timed relation with the corresponding pulses from units 12—17 at the transmitter. The gating circuits serve to separate the individual pulses as applied and in the case of time displacement modulation to translate the separated pulses into amplitude modulated form.

Each gating circuit is connected to the movable contact arms of individual switches 43—48, the fixed contacts of which are multipled together and to the respective signal reproducing devices 49—53. These reproducing devices may be constructed to pass the desired signal frequencies as is usual in such equipment. For a detailed description of the various units 18—42, references may be had to the copending application Serial No. 506,802, filed October 19, 1943, now Patent No. 2,429,613, or to Patent No. 2,048,081, the disclosures of which are incorporated herein by reference.

Figure 2:
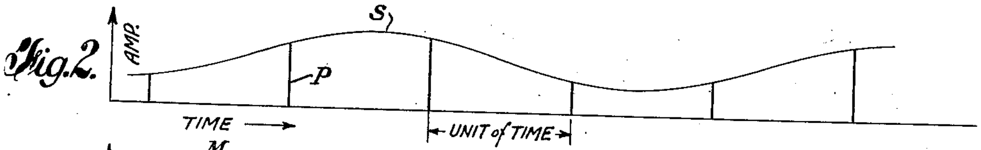
Fig. 2 is a graph representing, in enlarged form, a portion of the wave shape of a given signal to be transmitted.

Assume for purposes of explanation, that a portion of the intelligence wave to be transmitted is represented by the curve of Fig. 2, and assume that there are provided twenty-four pulse modulation channels similar to channels 1—6. Normally, each signal source would be associated with an individual pulse modulation channel and depending upon the repetition rate, as determined by the frequency of source 24, and the adjustment of units 18—23, the signal S (Fig. 2), would be represented by one or more pulses P per unit time. If greater delineation were required, then the repetition rate would be correspondingly increased to provide a series of time modulated pulses representing the necessary plurality of points on the curve S. However, it is desirable in setting up systems of this type to be able to use modulation units, each of which takes care of a uniform band width for each signal channel in accordance with the predetermined detail which is required. However, from time to time the intelligence being transmitted may require different band widths for the necessary delineation. Heretofore, it has been necessary in such systems to provide modulation channels each capable of handling a different band width and the signal source is connected to the particular channel which provides the necessary delineating band width.

In accordance with the present invention, the desired flexibility of band width is obtained without changing the normal repetition rate of the system and without requiring different band width modulation channels. For this purpose, the signal channels may be connected in parallel to any desired number of fixed band width channels. Merely for purposes of illustration, Fig. 1 shows the signal source 1 connected by means of switch 6 to a single pulse modulator 12. The source 2 however, may require greater band width, and therefore it is connected through its multipled connections to the corresponding fixed contacts of switches 7 and 8, so that the signals from source 2 are fed in parallel to the two modulators 13 and 14. In the case of source 3, there may be required even greater band width, in which event the said source 3 is connected through its multipled connections to the corresponding fixed contacts of switches 9, 10 and 11, whereby the said source 3 is fed in multiple to three separate pulse modulations 15, 16 and 17. The switches 6, 7, 8, 9, 10 and 11 may be manually controlled either individually or in ganged groups whereby their contact arms may be set on any particular fixed contact depending upon the number of pulse modulators to be connected in parallel to the respective signal channels.

Since the system inherently operates in time sequence, different information concerning the same signal from a given source is transmitted by each of the separate modulation channels to which it is connected in parallel. The net result therefore is a higher delineating rate and the attainment of a much higer faithfulness in the audio frequency transmission. Furthermore, the paralleling of the individual signal sources to one or more modulation channels does not change the basic operation of the pulse modulating system which can therefore be made sufficiently flexible to cover a wide range of required operating conditions. For example, the system shown in Fig. 1 can be designed so that each pulse modulator provides a transmission band width of 3200 C. P. S. By multipling the various modulation channels by means of the switching arrangement shown, the twenty-four channel system can be converted for example into a twelve channel system with approximately 6,400 C. P. S. band width channels or for example into a six channel system with 12,800 C. P. S. band width. The system therefore lends itself quite well to such applications as high fidelity multiplex broadcasting and the like.

There is the added advantage that since the source 24 is common to all the modulation channels, one fixed unmodulated marker pulse M (Fig. 3) can serve to supply the fixed timing reference for several modulated pulses of the same single channel. It will be understood that the modulating and demodulating audio equipment must of course be designed to pass the required band width as indicated.

Figure 3:
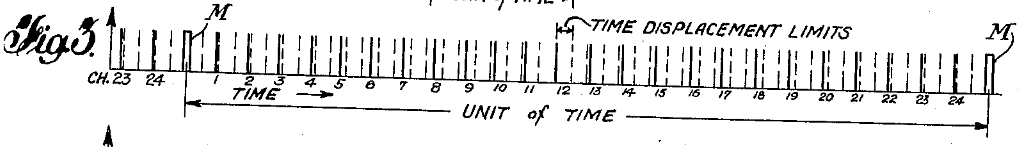
Fig. 3 is a pulse diagram corresponding to the curve of Fig. 2.
Figure 4:
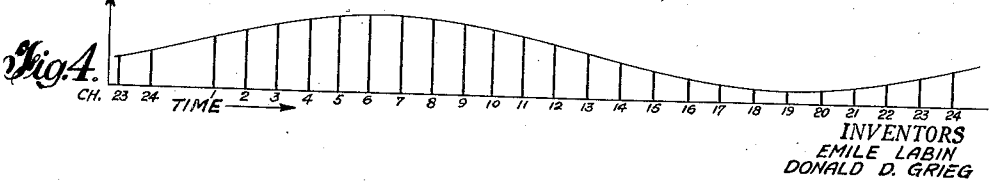
Fig. 4 shows the demodulation envelope derived from the pulse diagram of Fig. 3.

Figs. 3 and 4 show the ultimate arrangement wherein, for example, the signal source 1 is connected in multiple to all the twenty-four pulse modulation channels. It will be seen therefore, that the fidelity of delineation is increased 24-fold over that obtained where the signal source 1 is connected to a single pulse modulator channel. It will also be noted that when the marker pulse M occurs, there is a corresponding gap in the delineation of the modulation envelope, this being due of course to the fact that the marker pulse does not supply additional modulation delineation to the intelligence wave form. While the presence of this gap may add to the audio output a constant tone at the base marker frequency, the level of this frequency component can be arranged so as to be considerably lower than that of the signal modulation pulses, since there are many more pulses carrying the desired information. If it is desired to remove this spurious frequency from the audio signals, one such means would be to locate the marker pulse between the normal pulses, which are in turn at an average symmetrical position, and remove the marker pulse by width discrimination or similar means before application to the output audio system. Another method would be to decrease the marker pulse repetition rate to a sufficiently low value below the low frequency cutoff of the audio system. Still a third method would involve the use of a simple rejection circuit tuned to the objectionable frequency. Preferably also, the several pulse modulation channels are suitably phased with respect to each other so that for parallel transmission representing the same given signal source, the pulses representing that signal are substantially equally arranged during each repetition cycle. This, to a certain extent, can be controlled by the particular manner of multipling the various signal sources through the switches 6—11 to the appropriate pulse modulators.

While one particular embodiment has been disclosed herein, various changes and modifications may be made therein without departing from the spirit and scope of the invention.

What is claimed is:

1. In a communication system of the kind wherein a signal wave is represented by one or more modulation pulses, a plurality of pulse modulation channels each having a predetermined band width, means to render said channels effective at a predetermined repetition rate, a plurality of separate signal sources, a plurality of switches each having a movable arm and a plurality of contacts, means coupling each source to one of the contacts of each switch, and means connecting each channel to a separate one of the switch arms whereby upon movement of the switch arms each source may be selectably connected in parallel to certain of said channels whereby different modulation band widths may be used for certain signals without changing said repetition rate.

2. In a multiplex communication system having a plurality of signal sources, a plurality of signal reproducers one for each of said sources, a plurality of pulse modulator devices connectable to said sources, a plurality of pulse gating devices connectable to said reproducers, and means for transmitting signal pulses from said modulators to said gating devices; a multi-point switch coupled to the input of each modulator, a multipoint switch coupled to the output of each gating device, means to multiple said sources to the first-mentioned switches whereby a plurality of modulators can be controlled by the same source, and means to multiple said reproducers to the second-mentioned switches whereby a single reproducer can be controlled from a plurality of gating devices.

EMILE LABIN.
DONALD D. GRIEG.

REFERENCES CITED

The following references are of record in the file of this patent:

UNITED STATES PATENTS

| Number | Name | Date |
|---|---|---|
| 2,199,634 | Koch | May 7, 1940 |
| 2,227,108 | Roosenstein | Dec. 31, 1940 |
| 2,256,336 | Beatty | Sept. 16, 1941 |
| 2,272,070 | Reeves | Feb. 3, 1942 |
| 2,388,001 | Loughren | Oct. 30, 1945 |
| 2,405,252 | Goldsmith | Aug. 6, 1946 |
| 2,408,077 | Labin | Sept. 24, 1946 |